(12) United States Patent
Dominguez et al.

(10) Patent No.: US 7,352,537 B2
(45) Date of Patent: Apr. 1, 2008

(54) TUNED DAMPER FOR DISK DRIVE ACTUATOR ARM

(75) Inventors: Miguel Dominguez, San Jose, CA (US); Fu-Ying Huang, San Jose, CA (US); Jeffrey Alan Kerner, San Jose, CA (US); Hatem Radwan, Cairo (EG)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 259 days.

(21) Appl. No.: 11/165,782

(22) Filed: Jun. 24, 2005

(65) Prior Publication Data
US 2006/0291104 A1  Dec. 28, 2006

(51) Int. Cl.
G11B 5/55 (2006.01)

(52) U.S. Cl. .................................. 360/265.7

(58) Field of Classification Search ............. 360/265.7, 360/265.9, 266
See application file for complete search history.

(56) References Cited

U.S. PATENT DOCUMENTS

| | | | |
|---|---|---|---|
| 4,843,503 A | 6/1989 | Hazebrouck et al. | |
| 4,933,792 A | 6/1990 | Sleger et al. | |
| 5,771,135 A * | 6/1998 | Ruiz et al. | 360/244.3 |
| 5,796,553 A * | 8/1998 | Tangren | 360/244.9 |
| 5,801,905 A | 9/1998 | Schirle et al. | |
| 5,943,191 A * | 8/1999 | Giere et al. | 360/244.9 |
| 6,091,574 A | 7/2000 | Misso | |
| 6,215,623 B1 * | 4/2001 | Zhu | 360/244.3 |
| 6,473,272 B1 * | 10/2002 | Resh et al. | 360/266 |
| 6,704,164 B1 * | 3/2004 | Hiraoka | 360/244.8 |
| 6,744,597 B2 | 6/2004 | Nguyen et al. | |
| 6,775,104 B2 * | 8/2004 | Hong et al. | 360/244.1 |
| 6,879,467 B2 * | 4/2005 | Shimizu et al. | 360/265.9 |
| 6,982,852 B2 * | 1/2006 | Nagahiro et al. | 360/265.9 |
| 7,136,261 B2 * | 11/2006 | Bhattacharya et al. | 360/244.9 |
| 2002/0141114 A1 * | 10/2002 | Wittig et al. | 360/244.9 |
| 2003/0169537 A1 * | 9/2003 | Weichelt et al. | 360/265.9 |
| 2005/0152070 A1 * | 7/2005 | Funabashi et al. | 360/265.7 |

FOREIGN PATENT DOCUMENTS

| | | |
|---|---|---|
| EP | 246375 | 11/1987 |
| JP | 58203674 | 11/1983 |
| JP | 61271673 | 12/1986 |
| JP | 62065268 | 6/1987 |
| JP | 63058678 | 3/1988 |
| JP | 4079085 | 3/1992 |
| JP | 57103169 | 3/1992 |
| JP | 11066773 | 3/1999 |

OTHER PUBLICATIONS

"Magnetic Head Discrete Vibration Damper/ Tuner" IBM Anon. Disc. SA8900211 May 1992.

* cited by examiner

*Primary Examiner*—Angel Castro
(74) *Attorney, Agent, or Firm*—Duke Amaniampong

(57) ABSTRACT

Embodiments of the present invention include a disk drive actuator arm for reducing amplitude of vibration modes substantially planar to a disk surface. The actuator arm comprises a plurality of head arms coupled to the actuator arm, the head arms substantially equally spaced and substantially parallel to each other. The actuator arm further includes a damping material bonded to a surface of one of the plurality of head arms, wherein the surface is substantially parallel to the plurality of head arms. The actuator arm further includes a mass bonded to the damping material wherein the mass dampens the amplitude of vibration modes substantially planar to the disk surface.

19 Claims, 5 Drawing Sheets

TUNED DAMPER FOR DISK DRIVE ACTUATOR ARM

FIELD OF THE INVENTION

The present invention relates to the field of data storage devices. More particularly, embodiments of the present invention relate to damping modes of vibration in a disk drive assembly.

BACKGROUND OF THE INVENTION

A primary function of a disk drive actuator and its accompanying servo control system is to keep the read/write heads on track. It is desirable for the drive device to move quickly to improve seek times and achieve better performance. However, as disk drive components move more quickly, the dynamics of the drive components becomes more important to consider because the tolerances of the mechanical parts is very small. Natural mechanical resonances (e.g., modes) within the actuator limit the precision of the tracking system and adversely effect performance of the device.

Actuator dynamics often have high gain modes, which cause degraded drive performance. Typically, adding a servo notch at the frequency of the problem mode solves such problem modes. However, adding servo notches is often difficult when there are several high gain modes in the system. Each servo notch added to the system degrades drive performance, so only a few servo notches can normally be added. Some problem modes can be damped out by Constrained Layer Damping (CLD) attachments, but CLDs are effective only for bending modes and are not effective for reducing "in-plane" modes. As such, a need exists to reduce "in-plane" actuator arm modes.

SUMMARY OF THE INVENTION

Embodiments of the present invention include a tuned actuator arm for controlling in-plane modes. Embodiments of the present invention include a fairly thick metal backing attached to the actuator arms by a suitable damping material. In one embodiment of the invention, the damping material interacts between the metal backing and the actuator arm in shear. In one embodiment of the invention, the thickness of the metal backing of 0.15 mm or larger.

Specifically, embodiments of the present invention include a disk drive actuator arm for reducing amplitude of a vibration mode substantially planar to a disk surface. The actuator arm comprises a plurality of head arms coupled to the actuator arm, the head arms substantially equally spaced and substantially parallel to each other. The actuator arm further includes a damping material bonded to a surface of one of the plurality of head arms, wherein the surface is substantially parallel to the plurality of head arms. The actuator arm further includes a mass bonded to the damping material wherein the mass dampens the amplitude of the vibration mode substantially planar to the disk surface.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Reference will now be made in detail to embodiments of the present invention, a tuned damper for an actuator arm, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention include a tuned actuator arm for controlling in-plane modes in a disk drive. Embodiments of the present invention include a fairly thick metal backing attached to the actuator arms by a suitable damping material. In one embodiment of the invention, the damping material interacts between the stiff metal backing and the actuator arm in shear. In one embodiment of the invention, the thickness of the metal backing of 0.15 mm or larger. In one embodiment of the invention, a plurality of tuned dampers are bonded to a plurality of actuator arms, wherein the actuator arm remains symmetrical with the dampers in place.

Figure 1:
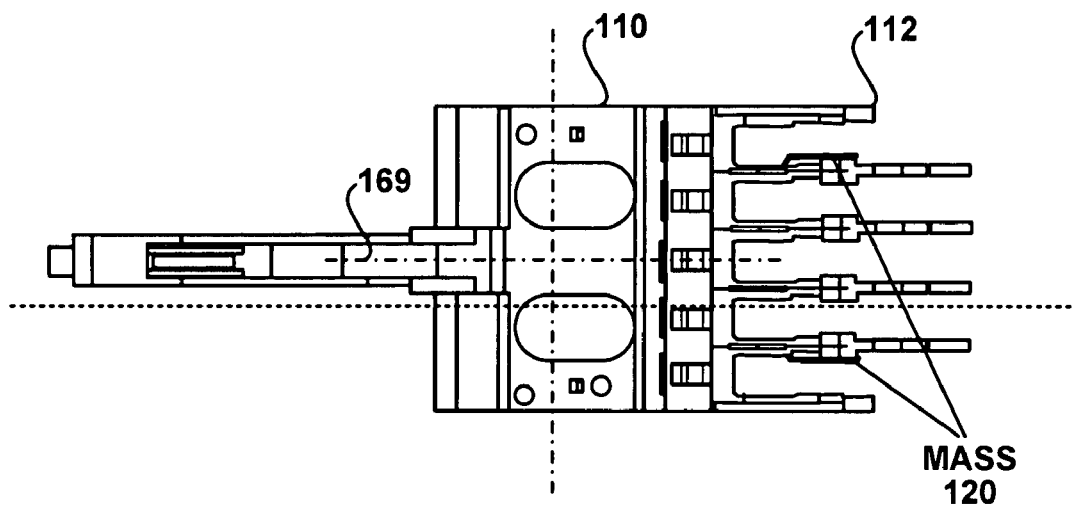
FIG. 1 is an illustration of an exemplary actuator arm in accordance with embodiments of the present invention.

FIG. 1 is an illustration of an exemplary actuator arm 100 in accordance with embodiments of the present invention. The actuator arm 100 is configured such that the head arms 112 are substantially parallel to a data storage disk (not shown) and substantially parallel to each other. In one embodiment of the invention, the head arms 112 are spaced with substantially equal distances between the head arms 112. In one embodiment of the invention, the actuator arm is substantially symmetrical with respect to a centerline 169.

In one embodiment of the invention, mass dampers 120 are bonded to surfaces of the head arms 112. In one embodiment, to maintain symmetry, one mass damper is bonded on a top surface of a head arm 112 and another mass damper is bonded on a bottom surface of a head arm 112. In one embodiment of the invention, multiple mass dampers are located at the dame distance from the centerline 169.

Figure 2:
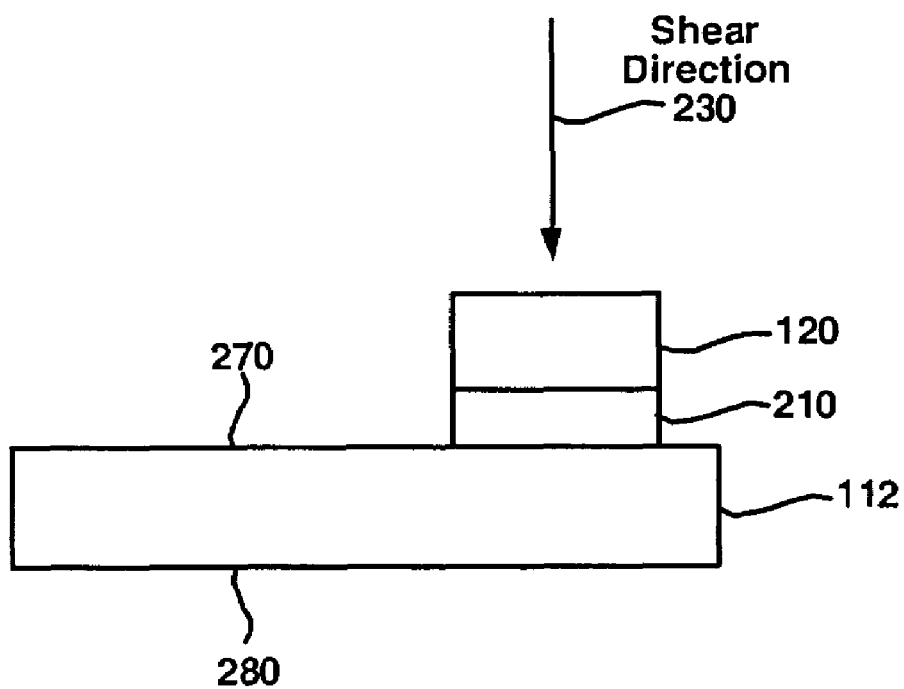
FIG. 2 is an illustration of an exemplary mass damper on a head arm in accordance with embodiments of the present invention.

FIG. 2 is an illustration of an exemplary mass damper 120 on a head arm 112 in accordance with embodiments of the present invention. In one embodiment of the invention, the mass 120 is bonded to the head arm by a damping material 210. In one embodiment of the invention, the damping material is loaded in shear when damping modes of vibration that are substantially planar with the head arm 112 as indicated by the shear direction indicator 230.

Prior Art tuned mass dampers for actuator arms in-plane modes load the damping material in compression/tension. However, embodiments of the present invention load the damping material in shear for improved damping of high frequency "in-plane" modes of vibration. In other words, the damper (e.g., combination of mass 120 and damping material 210) of the present invention damps vibration modes that are substantially "in-plane" meaning the vibration modes are substantially planar to the surface to the data storage disk (not shown) and substantially parallel to the top surface 270 and bottom surface 280 of the actuator arm 112. Sheer direction indicator 230 can be assumed to be pointing substantially in the direction out of FIG. 2.

In one embodiment of the invention, the mass is metallic. The metallic material can comprise stainless steel, aluminum, etc. In one embodiment of the invention, the mass/weight is determined based on the frequency of the mode that is being damped, as well as the bonding area and stiffness of the damping material used.

Figure 3:
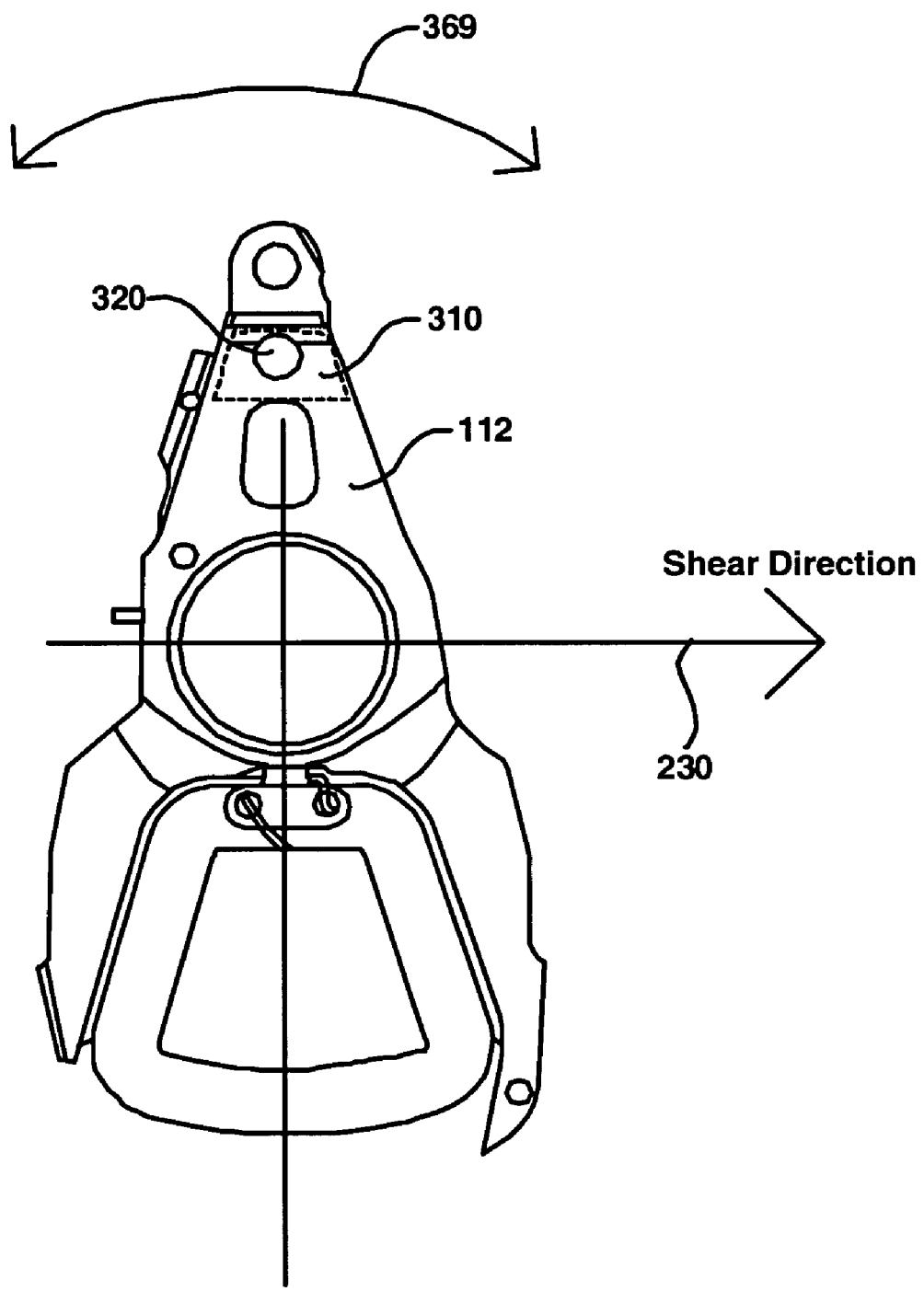
FIG. 3 is an illustration of an exemplary head arm of an actuator assembly in accordance with embodiments of the present invention.

FIG. 3 is an illustration of an exemplary head arm 112 of an actuator assembly in accordance with embodiments of the present invention. Mass 310 is positioned on a top surface of the head arm 112. In one embodiment of the invention, the mass 310 is located on the end of the head arm 112 at the location where a suspension (not shown) is attached. In one embodiment of the invention, hole 320 is the location where a suspension (not shown) is attached to the head arm 112.

In one embodiment of the invention, the head arm 112 is not modified other than the addition of the mass and damping material. This allows use of conventional and proven actuator assemblies without extensive modification or design of a completely new actuator assembly.

In one embodiment of the invention, the mass is positioned at the location where the amplitude (e.g., gain) of a particular vibration mode is substantially the greatest. In one embodiment of the invention, the frequency of the vibration mode is greater than 10 kHz.

As stated above, the mass damper of the present invention dampens vibration modes that are "in-plane." The mode direction identifier 369 shows the movement of an "in-plane" vibration mode. For instance, when the head arm 112 moves from side to side during a seek operation, the head arm 112 vibrates "in-plane" or planar with the disk surface (not shown). During an "in-plane" mode, the damping material 210 of FIG. 2 is loaded in shear.

Figure 4A:
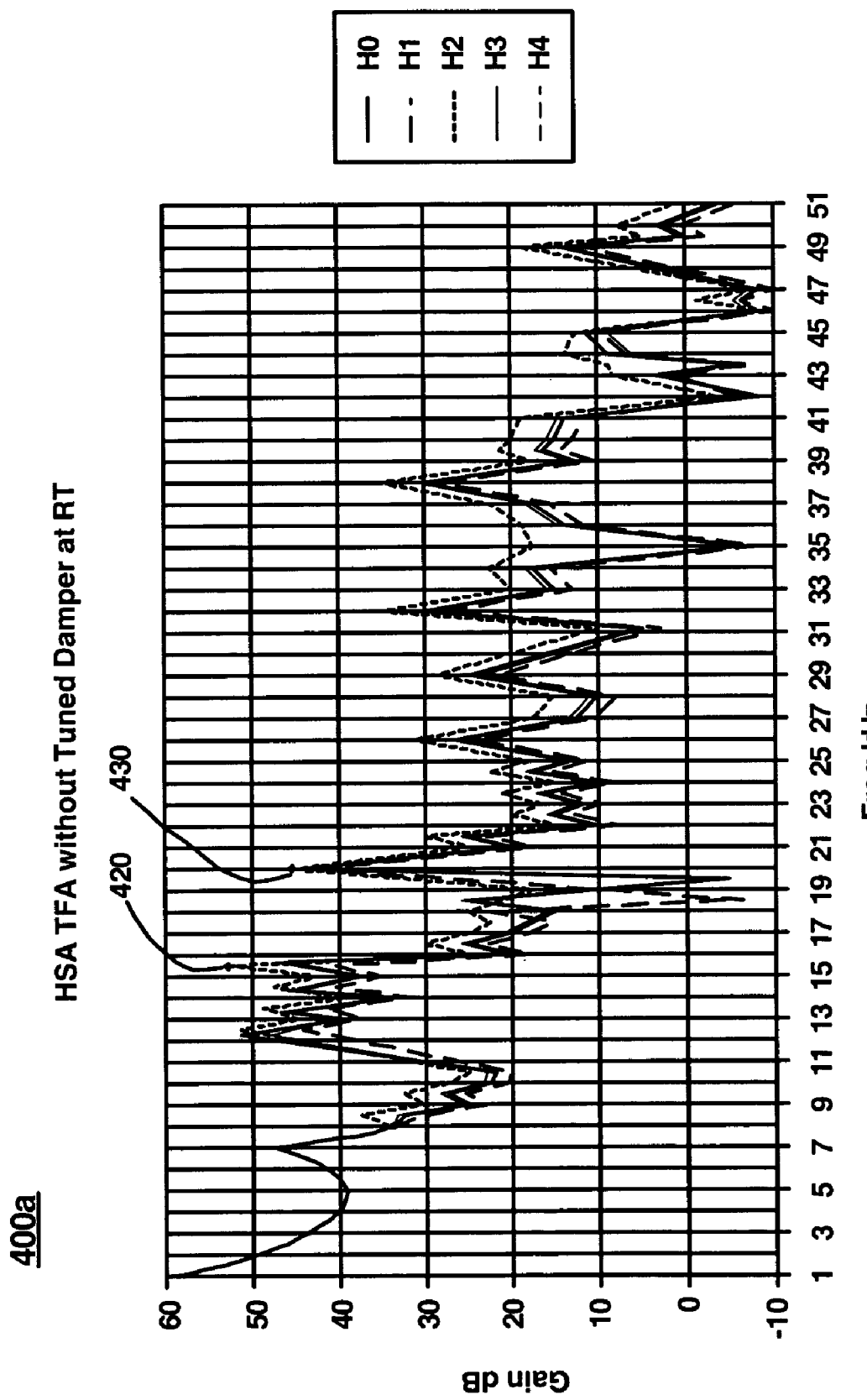
FIG. 4A is an illustration of a graph of a plurality of vibration modes of an actuator assembly prior to damping in accordance with embodiments of the present invention.

FIG. 4A is an illustration of a graph 400a of a plurality of vibration modes of an actuator assembly prior to damping in accordance with embodiments of the present invention. Prior to damping, the mode 420 has a maximum gain of approximately 54 dB at an approximate frequency of 16.6 kHz.

Prior to damping, the mode 430 has a maximum gain of approximately 45 dB at an approximate frequency of 20.2 kHz. Also included in FIG. 5A are a plurality of other modes of vibration.

Figure 4B:
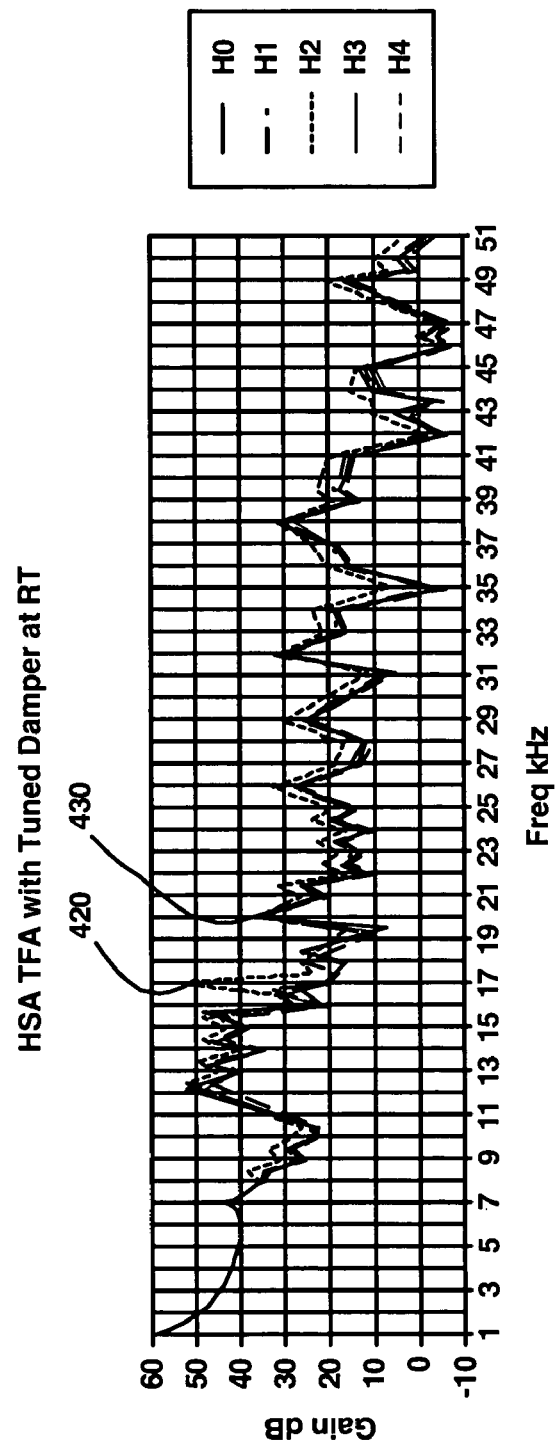
FIG. 4B is an illustration of a graph of a plurality of vibration modes of an actuator assembly with shear damping in accordance with embodiments of the present invention.

FIG. 4B is an illustration of a graph 400b of a plurality of vibration modes of an actuator assembly with shear damping in accordance with embodiments of the present invention. After damping, the mode 420 has a maximum gain of approximately 36 dB at an approximate frequency of 16.6 kHz. The reduction in amplitude is significant with the addition of the symmetric shear damping of the present invention as illustrated in FIGS. 1-4.

After damping, the mode 430 has a maximum gain of approximately 26 dB at an approximate frequency of 20.2 kHz. Also included in FIG. 5B are a plurality of other modes of vibration wherein the amplitude of the modes have been significantly reduced as a result of adding the symmetric shear damping of the present invention as illustrated in FIGS. 1-4.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A disk drive actuator arm for reducing amplitude of vibration modes substantially planar to a disk surface, said actuator arm comprising:
    a plurality of head arms coupled to said actuator arm, said head arms substantially equally spaced and substantially parallel to each other;
    a damping material bonded to a surface of one of said plurality of head arms, said surface substantially parallel to said plurality of head arms; and
    a mass bonded to said damping material wherein said mass dampens said amplitude of said vibration mode substantially planar to said disk surface wherein said mass is bonded to said head arm at a location where said amplitude of said vibration mode is substantially largest.

2. The disk drive actuator arm as described in claim 1 further comprising a plurality of masses bonded to a plurality of head arms by said damping material.

3. The disk drive actuator arm as described in claim 2 wherein said each of said plurality of masses are bonded on substantially equally spaced head arms.

4. The disk drive actuator arm as described in claim 2 wherein a first of said plurality of masses is bonded on a top surface of a first head arm and a second of said plurality of masses is bonded on a bottom surface of a second head arm and wherein said first surface and said second surface are substantially parallel.

5. The disk drive actuator arm as described in claim 1 wherein said mass dampens said vibration modes substantially planar to said disk surface by loading said bonding material in shear with respect to said mass and said head arm.

6. The disk drive actuator arm as described in claim 1 wherein said mass is metallic.

7. The disk drive actuator arm as described in claim 1 wherein said mass is thicker than 0.15 mm in thickness.

8. A device for reducing amplitude of a vibration mode of a disk drive actuator arm comprising:
    a stiff metallic mass with a thickness greater than 0.15 mm; and
    a damping material bonded to said metallic mass for bonding said metallic mass to a surface of one of a plurality of head arms coupled to said disk drive actuator arm, said surface being substantially parallel to said plurality of head arms wherein said mass is bonded at a location where said amplitude of said vibration mode is substantially largest.

9. The device as described in claim 8 further comprising a plurality of masses for bonding to a plurality of surfaces of said head arms by said damping material.

10. The device as described in claim 9 wherein each of said plurality of surfaces of said head arms are substantially equally spaced.

11. The device as described in claim 9 wherein each of said plurality of surfaces are substantially parallel.

12. The device as described in claim 9 wherein said masses are bonded in locations that are substantially symmetric with respect to said actuator arm.

13. The device as described in claim 12 wherein a first of said plurality of masses is bonded on a top surface of a first head arm and a second of said plurality of masses is bonded on a bottom surface of a second head arm wherein said first and second surfaces are substantially parallel.

14. A substantially symmetric actuator arm assembly comprising:
    a plurality of substantially parallel actuator arms, each of said plurality of actuator arms comprising a bottom surface and a top surface wherein said bottom surfaces and said top surfaces are designed to be substantially parallel to a data storage disk; and
    a plurality of masses bonded to two or more of said plurality of substantially parallel actuator arms, said masses bonded by a damping material wherein one of said plurality of masses is bonded to one of said actuator arms at a location where said amplitude of said vibration mode is substantially largest.

15. The substantially symmetric actuator arm as described in claim 14 wherein a first of said plurality of masses is bonded to one of said top surfaces and a second of said plurality of masses is bonded to one of said bottom surfaces of said plurality of actuator arms.

16. The substantially symmetric actuator arm as described in claim 14 wherein plurality of masses have a thickness greater than 0.15 mm in thickness.

17. The substantially symmetric actuator arm as described in claim 14 wherein said plurality of masses is metallic.

18. The substantially symmetric actuator arm as described in claim 14 wherein one of said plurality of masses is loaded in shear when damping a vibration mode substantially in plane with said data storage disk.

19. The substantially symmetric actuator arm as described in claim 18 wherein said vibration mode has a frequency greater than 10 kHz.

* * * * *